United States Patent [19]
Mieda

[11] Patent Number: 5,776,208
[45] Date of Patent: Jul. 7, 1998

[54] APPARATUS AND METHOD FOR ASSEMBLING BATTERY

[75] Inventor: Masumi Mieda, Himeji, Japan

[73] Assignee: Kabushiki Kaisha Toshiba, Kawasaki, Japan

[21] Appl. No.: 704,659

[22] PCT Filed: Mar. 16, 1995

[86] PCT No.: PCT/JP95/00450

§ 371 Date: Sep. 13, 1996

§ 102(e) Date: Sep. 13, 1996

[87] PCT Pub. No.: WO95/25356

PCT Pub. Date: Sep. 21, 1995

[30] Foreign Application Priority Data

Mar. 16, 1994 [JP] Japan .................................. 6-044603

[51] Int. Cl.⁶ .................................................. H01M 6/02
[52] U.S. Cl. .................................. 29/623.1; 29/730
[58] Field of Search .................................. 29/730, 623.1

[56] References Cited

U.S. PATENT DOCUMENTS 4,574,472   3/1986   Epstein et al. .
5,099,569   3/1992   Ribordy et al. .

FOREIGN PATENT DOCUMENTS 56-167277   12/1981   Japan .
62-29057    2/1987    Japan .
62-90863    4/1987    Japan .
63-2398     6/1988    Japan .
63-299056   12/1988   Japan .

OTHER PUBLICATIONS

Form PCT/ISA/210 for PCT/JP95/00450, Jun. 1995.

*Primary Examiner*—John S. Maples
*Attorney, Agent, or Firm*—Finnegan, Henderson, Farabow, Garrett & Dunner, L.L.P.

[57] ABSTRACT

An outer casing and a center shaft of an electrode body are so disposed unparallel as to oppose each other by a swing mechanism, a side surface portion of the electrode body is brought into contact with an inner end portion of an opening of the outer casing by a moving mechanism, the outer casing and the center shaft of the electrode body are located substantially parallel to each other by utilizing the push force at the time of movement and the swing mechanism, and the bottom of the electrode body and the opening of the outer casing are automatically fitted and coupled so that the outer casing and the electrode body are fitted smoothly and automatically.

3 Claims, 4 Drawing Sheets

APPARATUS AND METHOD FOR ASSEMBLING BATTERY

TECHNICAL FIELD

The present invention relates to an apparatus and method for assembling a battery, and particularly to an assembling apparatus and method for automatically inserting an electrode body into the outer casing of a battery.

BACKGROUND ART

A battery has a basic structure which is simple to have a positive electrode and a negative electrode opposed mutually with a separator between them. Such a battery has output characteristics which are proportional to the opposed surface areas of the positive and negative electrodes. In recent years, there are demands for a battery which has output characteristics as high as possible, a high energy density, a long service life or rechargeability, and an environment-friendly property.

Under such circumstances, Japanese Patent Laid-open Publication No. Sho 63-299056 and Japanese Patent Laid-open Publication No. Sho 62-90863 describe to overlay positive and negative electrodes with a separator between them, and to wind in the form of a roll to substantially increase the opposed surface areas of positive and negative electrodes to provide batteries with high power.

Besides, to meet the above demands, a nonaqueous electrolyte battery, e.g., a lithium ion secondary battery, using lithium composite oxide as a cathode active material and a carbonaceous material as an anode active material has been used actually.

To provide power as high as possible, such batteries are designed to enlarge the opposed surface areas of the electrodes to the maximum and also to increase the number of overlaid electrodes to the maximum. Accordingly, the allowable tolerance of the inner size of an outer casing for accommodating these electrodes and the outer size of the electrodes are highly restrictive.

As shown in FIG. 7, for example, when an outer casing 12 is square, the outer casing 12 has an inner vertical size C of 7.5±0.1 mm while an electrode body 5 has an outer vertical size D of 7.2±0.05 mm, and the outer casing 12 has an inner width size E of 33.0±0.1 mm while the electrode body 5 has an outer width size F of 32.7±0.05 mm. Thus, they are designed to have very strict specifications with a tolerance of only 0.3 mm.

Therefore, it is very important to control the battery assembling process so that many electrodes are accurately overlaid or wound and the electrode body has the outer size within the specified tolerance, and the electrode body is smoothly inserted into the outer casing of the battery.

As to issues involved in the battery assembling process, Japanese Patent Laid-open Publication No. Hei 5-74424 for example has proposed to attach an insulating plate to the bottom of an electrode body to limit the outer size of the electrode body within a tolerance, and to facilitate the insertion of the electrode body into the outer casing.

But, in spite of such proposals, there is still a serious problem in mechanically inserting the electrode body smoothly into the outer casing. In other words, in order to automatically insert the electrode body into the outer casing, first the electrode body and the outer casing may be opposed mutually with their center axes for insertion aligned and automatically inserted mechanically.

However, because of such a small tolerance between the inner size of the outer casing and the outer size of the electrode body, the conventional automatic assembling apparatus having the structure based on a simple idea has a difficulty in exactly aligning the bottom of the electrode body and the opening of the outer casing, so that the bottom of the electrode body is brought into contact with the opening edge of the outer casing, damaging the bottom of the electrode body and extremely increasing an insertion fraction defective.

Accordingly, as the most secure inserting method, workers can manually insert one by one. But, its work efficiency is limited and productivity is low, hindering cost-reduction measures.

It is also possible to use robots which operate in the same way as human hands do to insert the components, but there are still problems in view of costs and work spaces.

The present invention has been completed in view of the above circumstances, and aims to provide an apparatus and method for assembling a battery, enabling to automatically insert an electrode body into an outer casing smoothly even when the inner size of the outer casing and the outer size of the electrode body have a very small tolerance.

SUMMARY OF THE INVENTION

The present invention relates to an apparatus for assembling a battery to insert an electrode body into an outer casing so that the center axis of the electrode body and the center axis of the outer casing is substantially in a straight line, the electrode having an outer size smaller than an inner size of the outer casing, and the outer casing having an opening at one end, comprising, an electrode body supplying mechanism for conveying at prescribed intervals the electrode body, an outer casing supplying mechanism for conveying at prescribed intervals the outer casing, a swing mechanism for disposing to oppose the electrode body and the outer casing and inclining to a prescribed angle at least either of center axes of the electrode body and the outer casing so as to intersect with the other center axis substantially on the same plane, a moving mechanism for contacting an inner end portion of the opening of the outer casing with a side face portion of the electrode body, and moving at least either of the electrode body and the outer casing toward the other so as to align substantially straight the center axis of the electrode body and the center axis of the outer casing, and a fitting mechanism for inserting the electrode body into the outer casing; and a method for assembling a battery using an apparatus for assembling a battery to insert an electrode body into an outer casing so that the center axis of the electrode body and the center axis of the outer casing is substantially in a straight line, the electrode having an outer size smaller than an inner size of the outer casing, and the outer casing having an opening at one end, comprising the steps of carrying the electrode body at prescribed intervals by an electrode body supplying mechanism, carrying the outer casing at prescribed intervals by an outer casing supplying mechanism, disposing to oppose the electrode body and the outer casing and inclining to a prescribed angle at least either of the center axes of the electrode and the outer casing so as to intersect with the other axis substantially on the same p lane by a swing mechanism, contacting an side surface portion of the electrode body with an inner end portion of the outer casing and moving at least either of the electrode body and the outer casing toward the other so as to align substantially straight the center axis of the electrode body and the center axis of the outer casing by an moving mechanism, an d inserting the electrode body into the outer casing by a fitting mechanism.

The following are the decomposed steps of inserting the electrode body into the outer casing of a battery according to the invention. Step (1), the outer casing and the electrode body are disposed to oppose each other so as to align the outer casing and the center axis of the electrode body in the inserting direction. Step (2), the bottom of the electrode body is inserted into the opening of the outer casing. And step (3), the electrode body is completely fitted into the outer casing. Among them, step (2) is the most critical issue in an automating process. Namely, what is important is how accurately match the opening of the outer casing with the bottom of the electrode body.

In step (1) above of the present invention, at least either of center axes of the electrode body and the outer casing is inclined by the swing mechanism to a prescribed angle so as to be disposed substantially unparallel with the other center axis substantially on the same plane to oppose the electrode body and the outer casing. Namely, as a fitting head for holding at least either of the outer casing and the electrode body, the swing mechanism which can easily incline the center axis with a shaft as the incline axis by a small push force is employed.

Then, in step (2) above, at the state that the electrode body and the outer casing are disposed to oppose mutually with their center axes held unparallel, at least either of the outer casing and the electrode body is moved to contact them mutually. Since the center axes of the outer casing and the electrode body are held unparallel on the same plane when they are first contacted, an inner end portion of the opening of the outer casing is contacted with a side surface portion of the electrode body.

And, when movement is continued in this state, the contacted inner end portion of the opening of the outer casing is pushed by the contacted side surface portion of the electrode body. Since the swing mechanism is designed to easily swing the center axis by a low push force, the center axes of the electrode body and the outer casing are swung to align substantially straight in the inserting direction by the push force after the contact of the electrode body with the outer casing, and the bottom of the electrode body is automatically and accurately fitted into the opening of the outer casing.

Accordingly, when the bottom of the electrode body is automatically and accurately fitted into the opening of the outer casing, step (3) is easy to force the electrode body into the outer casing to a prescribed extent. As described above, the apparatus and method for assembling a battery according to the present invention can fit the electrode body into the outer casing smoothly and automatically to assemble the battery.

BEST MODE FOR CARRYING OUT THE INVENTION

An embodiment of the invention will be described in detailed below.

Figure 1:
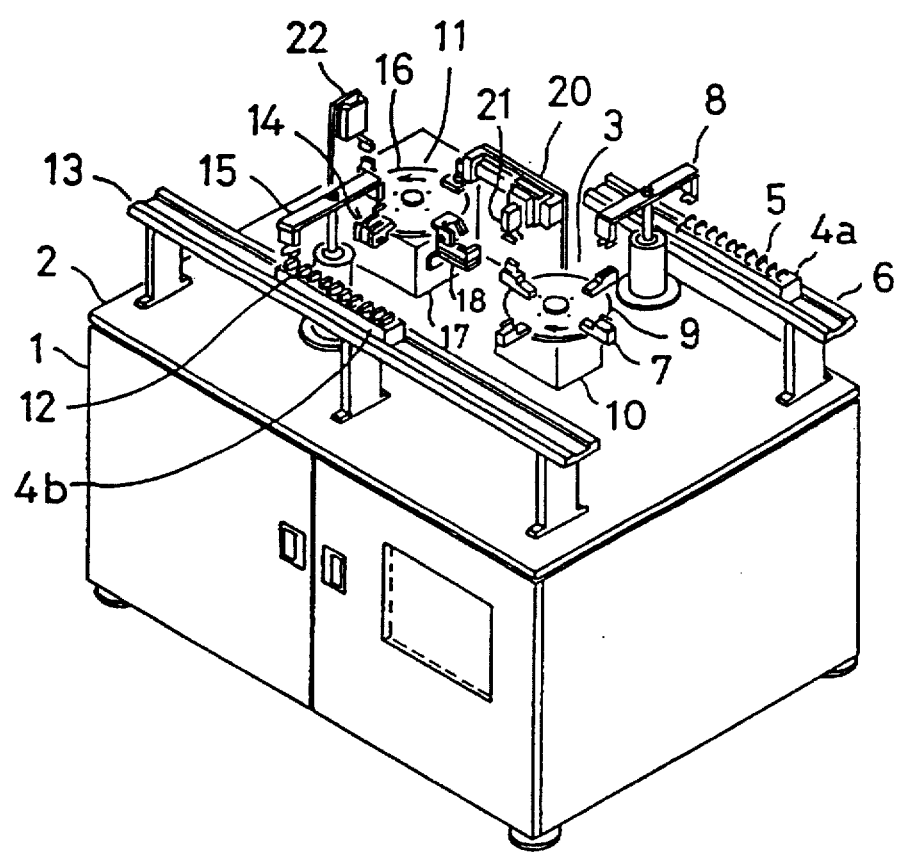
FIG. 1 is a schematic structural view for illustrating the assembling apparatus according to an embodiment of the present invention.

FIG. 1 is a schematic structural view for illustrating the assembling apparatus according to an embodiment of the present invention, and FIGS. 2 to 7 are exploded views for illustrating an assembling process.

Figure 2:
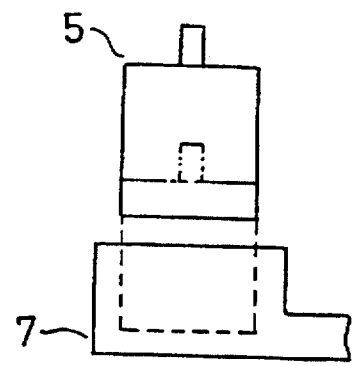
FIG. 2 is a schematic view showing an electrode body and an electrode body fitting head of FIG. 1.

FIG. 1 shows that respective mechanisms configuring this assembling apparatus are disposed on a top substrate 2 of a base 1. An electrode body supplying mechanism 3 comprises an electrode body carrying conveyor 6 for sequentially conveying at intervals electrode bodies 5 placed on an A carrier holder 4a, an electrode body supplying transfer 8 for supplying electrode body fitting heads 7 with the electrode bodies 5 carried by the electrode body carrying conveyor 6, and an A drive mechanism 10 for sequentially driving at intervals an A turn table 9 which has a plurality of electrode body fitting heads 7. FIG. 2 shows a state of the electrode body fitting head 7 and the electrode body 5.

An outer casing supplying mechanism 11 comprises an outer casing carrying conveyor 13 for sequentially conveying at intervals outer casings 12 placed on a B carrier holder 4b, an outer casing supplying transfer 15 for supplying outer casing fitting heads 14 with the outer casings 12 carried by the outer casing carrying conveyor 13, and a B drive mechanism 17 for sequentially driving at intervals a B turn table 16 which has a plurality of outer casing fitting heads 14.

Figure 3:
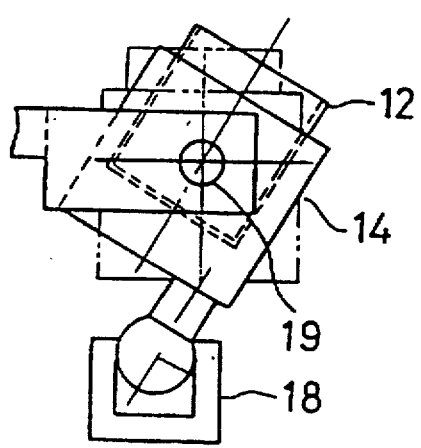
FIG. 3 is a schematic view showing an outer casing fitting head and a swing mechanism of FIG. 1, and FIGS. 4 to 7 are schematic views for illustrating a fitting process of the outer casing and the electrode body.

As shown in FIG. 3, the outer casing fitting head 14 is provided together with a swing mechanism 18 which is axially supported so as to be swung with a shaft 19 as a fulcrum to tilt the central axis of the outer casing 12 to a prescribed angle.

An electrode body moving mechanism 20 is disposed between the electrode body supplying mechanism 3 and the outer casing supplying mechanism 11, provided with a chuck 21 for holding the electrode body 5, and configured to move vertically and back and forth. Further, an electrode body fitting mechanism 22 is configured to couple the electrode body 5 and the outer casing 12 by the electrode body moving mechanism 20 and to vertically move to insert the electrode body 5 to reach the bottom of the outer casing 12.

Now, the assembling operation of the assembling apparatus shown in FIG. 1 will be described. With the electrode body supplying mechanism 3, the electrode bodies 5 carried by the electrode body carrying conveyor 6 are supplied to the electrode body fitting heads 7 by the electrode body supply transfer 8, and sequentially moved at intervals by the A drive mechanism 10 to the transferring position for the electrode body 5.

With the outer casing supplying mechanism 11, the outer casings 12 carried by the outer casing carrying conveyor 13 are supplied to the outer casing fitting heads 14 by the outer casing supplying transfer 15, and sequentially moved at intervals by the B drive mechanism 17 to the transferring position for the outer casing 12. At the transferring position, the outer casing fitting head 14 is positioned to oppose the electrode body 5 with the center axis of the outer casing 12 inclined in the same plane to a prescribed angle by the swing mechanism 18 as shown in FIG. 4.

Then, the electrode body 5 in the electrode body fitting head 7 is held by the chuck 21 of the electrode body moving mechanism 20 and moved to the outer casing supplying mechanism 11. At this time, as shown in FIG. 4, a side surface portion of the electrode body 5 is brought into contact with an inner end portion of the opening of the outer casing.

Figure 4:
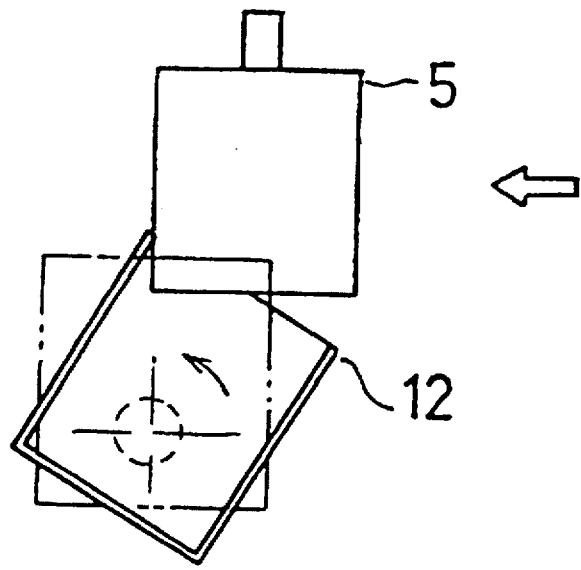
Figure 5:
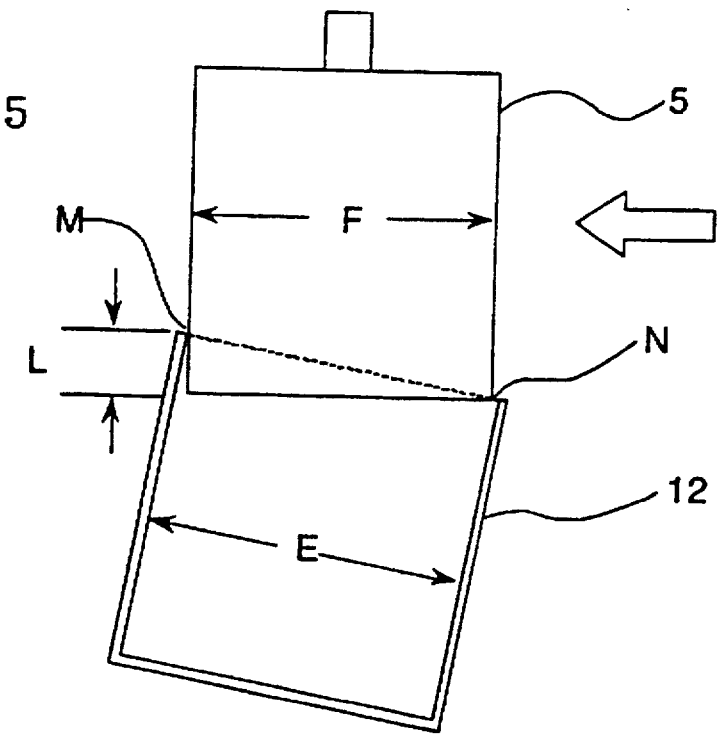
Figure 6:
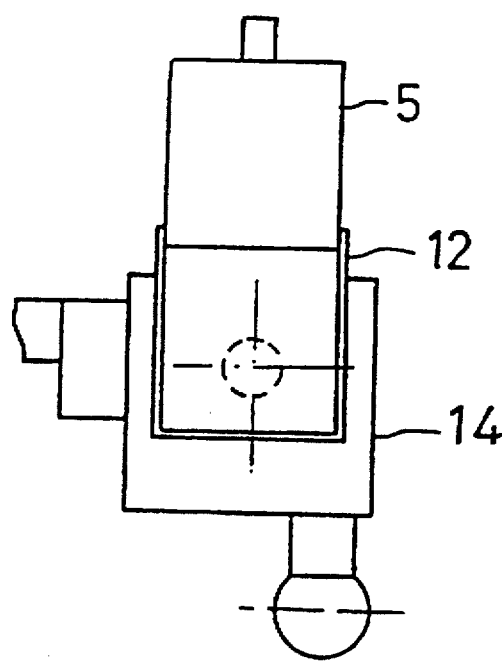
Figure 7:
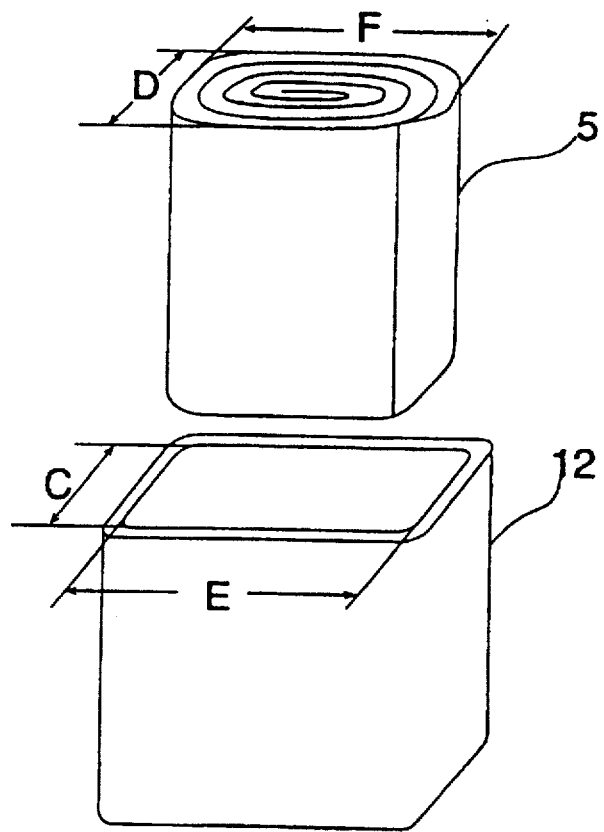

As the electrode body moving mechanism 20 is further moved forward, the swing mechanism 18 of the outer casing fitting head 14 is swung by the push force owing to the advancing movement from the direction indicated by the arrow in FIG. 4 and FIG. 5 so as to substantially align straight the center axis of the outer casing 12 and the center axis of the electrode body 5. As a result, as shown in FIG. 6, the bottom of the electrode body 5 and the opening of the outer casing 12 are automatically fitted and coupled.

For example, as shown in FIG. 5, the outer casing 12 is square, the electrode body 5 has an outer width size F of 32.7±0.05 mm, the outer casing 12 has an inner width size E of 33.0±0.1 mm, and a distance L from the bottom of the electrode body to point M, where the opening inner end of the outer casing is in contact with the side surface of the electrode boy, is 2.0 mm. At this time, a distance between M and N of the electrode body is 32.76 mm which is sufficiently within a tolerance with respect to the inner width size E of 33.0±0.1 mm of the outer casing 12.

Thus, after automatically fitting and coupling the bottom of the electrode body 5 and the opening of the outer casing 12, the chuck 21 is lowered to force the electrode body 5 into the outer casing 12. And, at the next position, the electrode body 5 is further pushed by the electrode body fitting mechanism 22 to reach a prescribed position of the bottom of the outer casing 12.

The outer casing 12 into which the electrode body 5 is completely inserted is moved from the outer casing fitting head 14 to the B carrier holder 4b by the outer casing supplying transfer 15, and carried to the next process by the outer casing carrying conveyor 13.

The above embodiment has been described where the outer casing and the electrode body are square, but it is to be understood that the invention is not limited to it and can be applied to the outer casing and the electrode body which are cylindrical or elliptical.

Besides, in the above embodiment, the swing mechanism was disposed on the side of the outer casing fitting head and the moving mechanism on the side of the electrode body, but the swing mechanism may be disposed on the side of the electrode body and the moving mechanism on the side of the outer casing fitting head. Otherwise, both mechanisms may be disposed on the sides of the electrode body and the outer casing fitting head. In other words, since such movements are relative between the outer casing and the electrode body, the swing mechanism and/or the moving mechanism may be disposed on at least either side of the outer casing fitting head and the electrode body.

INDUSTRIAL APPLICABILITY

According to the apparatus and method for assembling a battery of the present invention, an outer casing and a center shaft of an electrode body are so disposed substantially unparallel as to oppose each other substantially on the same plane by a swing mechanism, a side face portion of the electrode body is brought into contact with an inner end portion of an opening of the outer casing by a moving mechanism, the outer casing and the center shaft of the electrode body are located substantially parallel to each other by utilizing the push force at the time of movement and the swing mechanism, and the bottom of the electrode body and the opening of the outer casing are automatically fitted and coupled.

According to this automatic fitting process, even when a tolerance between the outer casing inner size and the electrode body outer size is very small, the bottom of the electrode body can be fitted smoothly and automatically into the opening of the outer casing, extensively improving work efficiency and productivity. And, the electrode body is protected from being damaged.

Accordingly, the present invention can provide an apparatus and method for assembling a battery, thereby easily achieving a process of fitting and assembling the electrode body and the outer casing which was most difficult to automate.

I claim:

1. A method for assembling a battery using an apparatus for assembling a battery to insert an electrode body into an outer casing so that a center axis of the electrode body and a center axis of the outer casing are substantially in a straight line, the electrode having an outer size smaller than an inner size of the outer casing, and the outer casing having an opening at one end, comprising the steps of:

carrying the electrode body at prescribed intervals by an electrode body supplying mechanism;

carrying the outer casing at prescribed intervals by an outer casing supplying mechanism;

disposing to oppose the electrode body and the outer casing and inclining to a prescribed angle at least either of the center axes of the electrode body and the outer casing so as to intersect with the other axis substantially on the same plane by a swing mechanism;

contacting a side surface portion of the electrode body with an inner end portion of the outer casing and moving at least either of the electrode body and the outer casing toward the other so as to align in a substantially straight line the center axis of the electrode body and the center axis of the outer casing by a moving mechanism; and inserting the electrode body into the outer casing by a fitting mechanism.

2. An apparatus for assembling a battery to insert an electrode body into an outer casing so that a center axis of the electrode body and a center axis of the outer casing are substantially in a straight line, the electrode having an outer size smaller than an inner size of the outer casing, and the outer casing having an opening at one end, comprising:

an electrode body supplying mechanism for conveying at prescribed intervals the electrode body;

an outer casing supplying mechanism for conveying at prescribed intervals the outer casing;

a swing mechanism for disposing to oppose the electrode body and the outer casing and inclining to a prescribed angle at least either of center axes of the electrode body and the outer casing so as to intersect with the other center axis substantially on the same plane;

a moving mechanism for contacting an inner end portion of the opening of the outer casing with a side face portion of the electrode body, and moving at least either of the electrode body and the outer casing toward the other so as to align substantially in a straight line the center axis of the electrode body and the center axis of the outer casing; and a fitting mechanism for inserting the electrode body into the outer casing.

3. An apparatus for assembling a battery to insert an electrode body into an outer casing having an opening, comprising:

a swing mechanism for disposing to oppose the electrode body and the outer casing and inclining to a prescribed angle at least either of center axes of the electrode body and the outer casing so as to intersect with the other center axis substantially on the same plane;

a moving mechanism for contacting an inner end portion of the opening of the outer casing with a side face portion of the electrode body, and moving at least either of the electrode body and the outer casing toward the other so as to align substantially in a straight line a center axis of the electrode body and a center axis of the outer casing; and a fitting mechanism for inserting the electrode body into the outer casing.

* * * * *